April 17, 1928.  1,666,737
A. L. DE LEEUW
GEAR GRINDER
Filed March 23, 1926   6 Sheets-Sheet 1

April 17, 1928.  
A. L. DE LEEUW  
GEAR GRINDER  
Filed March 23, 1926   6 Sheets-Sheet 3  
1,666,737

Inventor  
Adolph L. De Leeuw  
By Attorney  
Albert F. Nathan

April 17, 1928.  A. L. DE LEEUW  1,666,737

GEAR GRINDER

Filed March 23, 1926   6 Sheets-Sheet 4

April 17, 1928.  1,666,737
A. L. DE LEEUW
GEAR GRINDER
Filed March 23, 1926    6 Sheets-Sheet 5

Inventor
Adolph L. De Leeuw
By Attorney
Albert F. Nathan

April 17, 1928.  A. L. DE LEEUW  1,666,737
GEAR GRINDER
Filed March 23, 1926   6 Sheets-Sheet 6

Inventor
Adolph L. De Leeuw
By Attorney
Albert F. Nathan

Patented Apr. 17, 1928.

1,666,737

UNITED STATES PATENT OFFICE.

ADOLPH L. DE LEEUW, OF PLAINFIELD, NEW JERSEY, ASSIGNOR OF ONE-HALF TO ALBERT F. NATHAN, OF NEW YORK, N. Y.

GEAR GRINDER.

Application filed March 23, 1926. Serial No. 96,706.

This invention deals with a method of and an apparatus for the generative grinding of accurate gears in groups comprising gears of similar or dissimiliar dimensions, as may be desired.

In many factories, the machines produced often embody a diversity of gears; some being large and some small but usally of a uniform pitch. It is quite a manufacturing problem to have on hand a full assortment of all the gears needed in assembling the machines. That is habitually done by making up in advance a sufficiently large stock of each of the various sizes so that an ample supply will always be on hand. But this involves a decided difficulty in that gear making machines, as at present designed, are adapted for producing but one size at a time. It is impractical to install as many gear making machines as there are different sizes of gears, and therefore the gear making machine must first be carefully adjusted and set up to make a given size. and must be run on that size until a sufficient quantity had been produced. Then it must be readjusted and set up for the next size and again run until a sufficient number of those gears have been produced; and so on. This means that a very large number of gears must be made up before one of each size becomes available in the stock-room for assembly purposes.

One of the aims of this invention is to creat a gear generating machine capable of simultaneously handling and finishing any predetermined group of gears, whether the group be composed of gears of the same size or of an assortment of sizes. Such a machine exhibits certain distinctive advantages to manufacturers inasmuch as it enables them to turn out gears as fast as required for assembling purposes and relieves them of the necessity of carrying an excessive stock of gears and it also enables manufacturers to put any new machines almost immediately into quantity production by reason of the ability to turn out an immediate output of such gears and in such sizes as the new machine will require.

The attainment of higher degrees of accuracy in gears has been the goal toward which the industry has for long been striving. It has been found that gears cannot be hardened, after having been machined, without an undesirable amount of warping. After having been thus hardened, their teeth can be restored to accurate contours only by a grinding operation which, as commonly done, is an exceedingly slow and time-consuming operation. One of the primary objects of this invention is to diminish the loss of time consumed in grinding by making the general operation one that is substantially continuous with respect to a large number of initially inserted blanks; thus avoiding all oscillations or reciprocations (which necessarily consume much time and energy in overcoming the inertia and momentum) and likewise avoiding the loss of time involved in frequent supervisions by the mechanic.

Contouring a geared tooth by a development operation has been practised since the beginning of the art but not without certain inaccuracies due to structural defects. The present invention seeks to achieve a high degree of accuracy by a close adherence to mechanically correct principles and by avoiding structural complexity and by rendering available a method of operation such that its inherent tendency will be, not towards the accumulations of errors but on the contrary towards the dissipation of errors thereby enabling the apparatus to produce gears, all of the teeth of which are ground to identical tooth-contours.

Another object of this invention is to devise means so combined with and related to the machine that the grinding wheels may easily and accurately be kept dressed with their grinding regions conforming exactly to proper shape required by the machine for producing perfect gears.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig.

2 is a general plan illustrating the relation between the grinding wheels and the orbital series of differently sized gears being ground, this plan being taken along line 2—2 of Fig. 1.

It is of importance, in keeping down the cost of production that a given machine should require a minimum amount of supervision and should require but little skill on the part of the attendant. The ideal machine is one that can be set up and "loaded" with a large supply of blanks, and then left to itself with the assurance that it will require little, if any, observation until it is convenient for the attendant to remove all of the blanks and re-load the machine. This is the type of machine aimed at by the present invention and it comprises, generally speaking, a large number of spindles on which may be placed stacks of gear-blanks. Certain or all of these spindles may be adjustable so that the gears of a given stack may be of a different size than those of another stack; thereby enabling the machine to turn out (at the end of each period of operation) whatever assortment of gears the user may require in the routine of his business. The invention contemplates one, or as many, grinding wheels as may be desired, preferably all so rotating as to throw the particles down and away from the surfaces being ground; these grinding wheels being adapted, during the aggregate interval between the starting and stopping of the machine, to enter into engagement with every portion of the tooth-surfaces of the blanks and to act upon those portions by a movement of "development" so that each microscopic region of action will conform accurately to the true curve.

To accomplish this in the simplest possible manner and, consequently in the most accurate way, this invention proposes the employment of a central gear permanently meshing with a peripheral series of master-pinions; the particular teeth of the central gear adjacent and including those which are in tangential alignment with the grinding-wheels being very accurately formed to a geometrically correct contour. To compel each grinding wheel to act on each tooth unit of each blank, and to do so without mechanical complication, the relation between the central gear and the master-pinions involves the "hunting-cog" principle. That is to say, the teeth of the central gear are selected so as to have a relatively prime ratio to the teeth of the master pinions; this being achieved by adopting a prime number of teeth on the central gear. In the case depicted by the drawings (which are to be understood as diagrammatic) the central gear may be regarded as having seventy-one teeth for each half, i. e., for each portion attributable to each of the grinding wheels. In this instance, these wheels are shown symmetrically spaced and hence the total number of teeth will be one hundred and forty-two. For simplicity of analysis, it will suffice to assume that there is but one grinding wheel and that it initially coincides with tooth No. 1 of the prime gear. If N be some prime number representing the teeth of that gear and $n$ be the number of teeth of the pinion, then after the prime gear has turned $n$ times (and the pinion has turned N times) tooth No. 1 of the prime gear will again be in contact with the original tooth of the pinion. Hence, after the prime gear has made $n$ turns, its same tooth will have contacted once with each tooth of that pinion, and, if that tooth be a grinder, will have completed the grinding of a very narrow convolution of that gear, if, simultaneously with the rotation there be also a progressive translation.

This cycle will be repeated until such convolutions in the aggregate equal the width of the gear blank. In other words, if F represents the feed of the grinding wheel in units of length for $n$ convolutions of the prime gear, and if W is the width of the pinion, after the prime gear has made $\frac{Wn}{F}$ turns, the grinding of the gear-blank will have been completed.

But as there may be a plurality of spindles, say S in number, that many other blanks (of an equal or smaller number of teeth) will be also completely ground by the time required to grind the largest gear-blank.

If T represents the turns per minute at which the prime gear may be run (and it may run fast since the grinding cuts are light) the time needed to grind a single blank will be $\frac{Wn}{FST}$.

Now, since a considerable number of spindles may be used to advantage, and as this corresponds with a central gear of large diameter, it becomes compatible to employ grinding wheels of relatively large diameter, thereby at once attaining the pronounced advantage of an extensive area of available abrasive material with a consequential reduction in the rate of wear, an ease in getting a high peripheral velocity, and a smoother finish on the work for a given rate of feed. This appears more manifest, in a practical sense, when it is realized that, with this arrangement, gears may be ground in but a fraction of the time habitually consumed in present practise.

Referring to the drawings, E represents a central gear and A, B, C, D, etc., represents an orbital or peripheral series of master-pinions in mesh with the central gear. The teeth of these master pinions are all formed as accurately as possible to conform to any selected involute tooth contour and certain of the teeth of the central gear are also formed as accurately as possible to the same standard; the teeth in question being the several teeth which locally underlie the portions of the grinding wheels which are actually doing the grinding. The intervening teeth of the central gear need not be formed of geometric accuracy as their functions are merely to preserve the timing of the pinions during the intervals between the successive engagements of the grinding wheels with the gear blanks. A characteristic of this invention is in the relation between the numbers of teeth on the central gear and the various tooth numbers for the pinions. That is to say, the teeth of the central gear are relatively prime to the teeth of each of the various pinions when the ratio is reduced to its lowest terms. For example, if the central gear contained a total of 54 teeth and a given pinion contained a total of 28 teeth, the ratio therebetween would be relatively prime; the only common divisor being unity when the ratio is reduced to its lowest terms. It is to be understood, that in no case should any of the pinions have any other than a relatively prime ultimate ratio to the teeth of the central gear. It, therefore, will be preferable to adopt a large prime number, or a multiple of a large prime number, for the number of teeth of the central gear; the prime number selected being in excess of any maximum number of teeth in any gear-blank that the machine would be expected to handle. By so doing, the user will be assured that the machine will properly grind every gear blank having from one up to that number of teeth.

Figure 1:
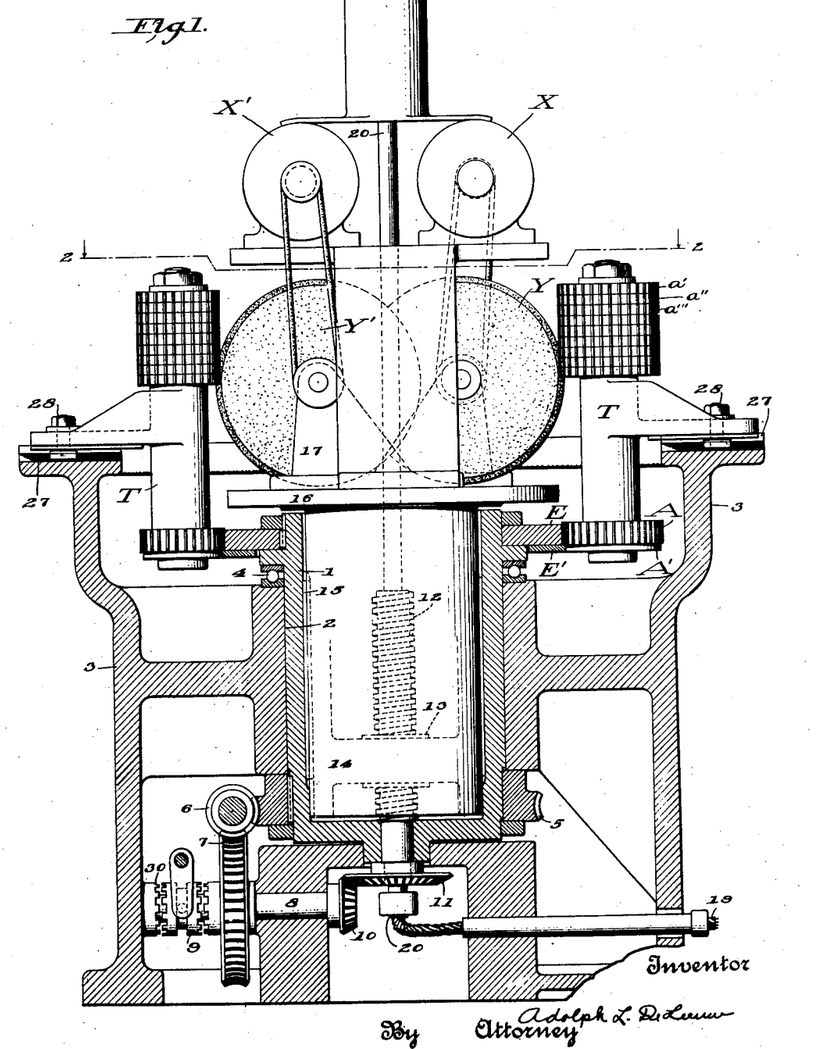
Figure 1 is an elevation, large in vertical section showing the co-action between two simultaneously-operating grinding-wheels and the stack of gears they are contouring.
Figure 2:
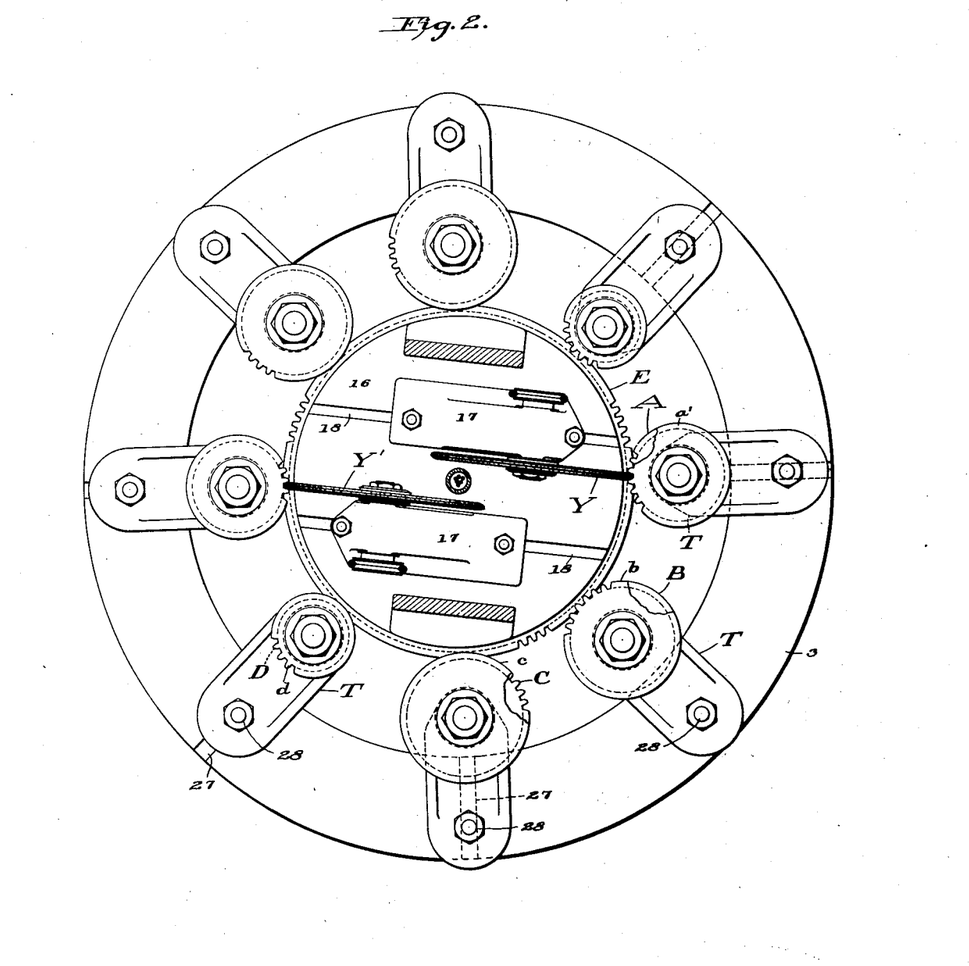
Figure 3:
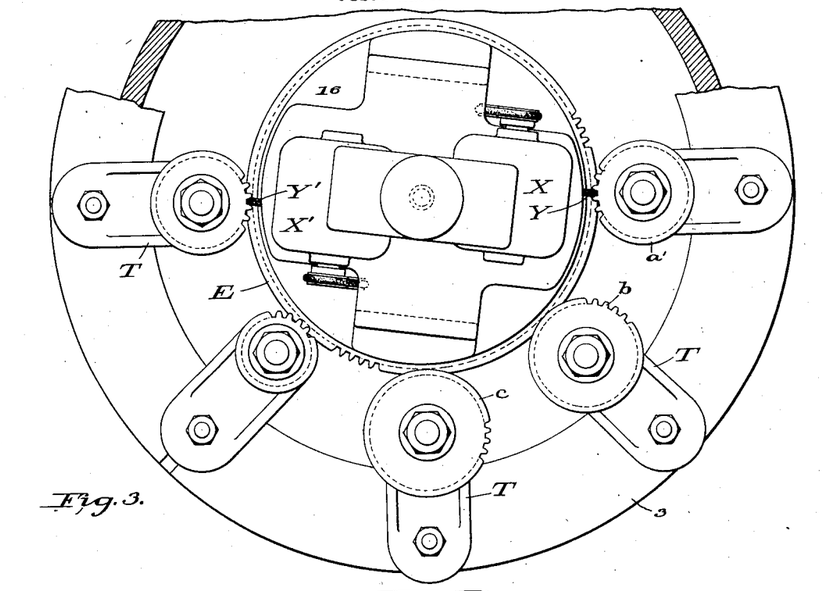
Fig. 3 is a plan somewhat similar to that of Fig. 2 but showing the motors superimposed over the grinding wheels.
Figure 4:
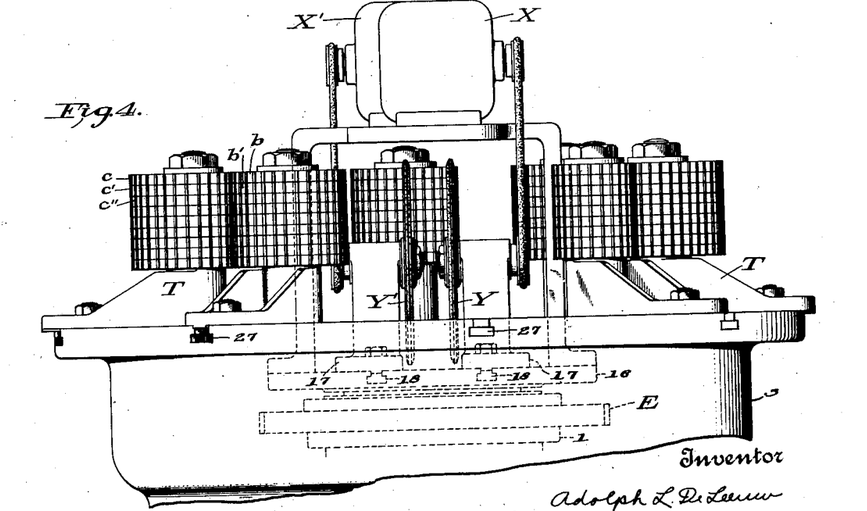
Fig. 4 is an elevation of so much of the machine as is shown in plan by Fig. 3.

The machine must provide means for accomplishing a relative roll between the pinions and the central gear, either by causing the pinions to travel with a planetary motion, or (what is the converse) by holding them in a fixed position and rotating the central gear. It will be sufficient to describe the latter and, in this case a central gear E is shown keyed to the upper end of a tubular sleeve 1 which is journaled at 2 in a central bearing provided by the main frame 3 (see Fig. 1), the sleeve 1 being supported by a suitable thrust bearing such as that indicated by 4. To rotate the sleeve 1 continuously, it may be provided with a worm wheel 5 meshing with a power driven worm 6 which also is in driving relation with another worm wheel 7 loose on a shaft 8 but adapted to be brought into driving engagement therewith by means of a clutch 9. The purpose of this latter train is to cause the grinding wheels progressively to follow a helical path and thereby gradually cover the aggregate width of a whole stack of gear blanks. This shaft 8 drives a pinion 10 which turns a bevel gear 11 fast to a vertical lead screw 12 which projects through a nut 13 secured to a large stem 14 which is telescopically arranged within the first-mentioned sleeve 1; a spline and key-way 15 serving to permit axial movement but no relative rotation between the sleeve and stem. This stem, at its upper end, carries the grinding wheels and their propelling mechanisms; these grinding wheels being mounted on the turn-table 16 in any appropriate manner, as by means of standards 17 which interfit with T-slots 18 so that they may be shifted to correctly position the grinding wheels for the dressing and grinding operations.

The grinding wheels are indicated by Y and Y' (two being shown in this instance) and they are arranged, when spur gears are to be ground, to rotate about a horizontal axes i. e., axes which are geometrically transverse to the axes of the pinions. For the grinding of helical gears, their axes will be tilted to correspond with the helix angle. It is to be noted that the T-slots 18 need not be radial, for reasons that will appear later, and that the grinding wheels may occupy offset relations to one another and may exceed in diameter the radius of the main or central gear. The grinding wheels are maintained in continuous motion by any appropriate means, such as the motors X and X'; it being desirable, however, that they be driven in a direction such that their outermost peripheries will move downwardly to throw the dust and sparks downwardly and away from the surfaces of the work blanks undergoing grinding.

Figure 7:
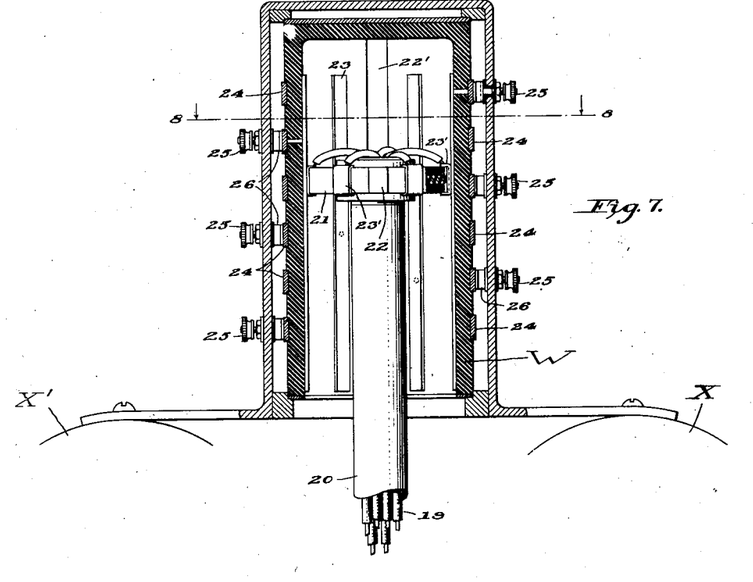
Figs. 7 and 8 are respectively a vertical section and a horizontal section representing a commutator such as may be used for attaining the electrical circuits during the rotation and the vertical translation of the turn table.
Figure 8:
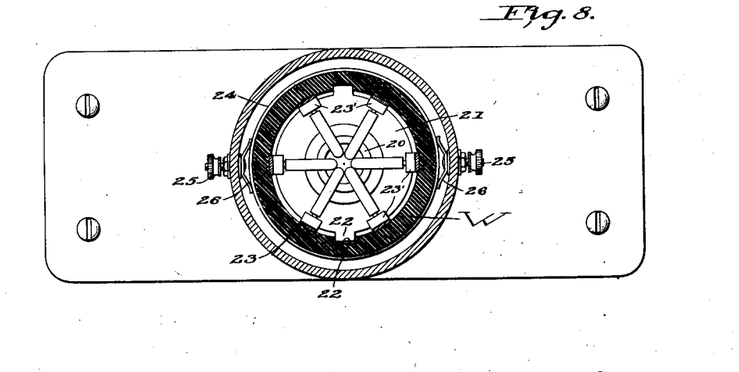

These motors may derive their electric current through any appropriate commutator, as from a main-line cable 19 which enters a conduit 20 extending through the central bore of the screw 12 and thence into a translatable but non-rotatable commutating element W. The upper end of the conduit carries a spider 21 which has a finger 22 entering a slot 22' in the commutating element W thereby enabling this element to shift up and down but not turn relatively to the conduit 20. A number of longitudinal conducting strips 23 are arranged in the inner wall of the commutating element W; each being connected with a companion conducting ring 24 on the outside of the commutating element W. The spider 21 carries a shoe 23' spring-pressed in continuous contact with the longitudinal strip 23 and the latter is thereby permanently connected with a source of current irrespective of the vertical movement of the commutating element W. The ring 24 continuously transmits the current to a binding post 25, although it may be in a state of rotation; this being done through a brush 26. The motors are connected by wires to appropriate binding posts and thereby are maintained in electric connection for all the movements of the machine and without interference.

The master pinion A is fixed to a spindle V which in turn is journaled in a bracket T. This bracket is supported on the main frame 3 and, inasmuch as it may be desirable to mount either larger or smaller work blanks on this spindle, the bracket may conveniently be adjustable. Thus, it may interfit with the radial T-slot 27 and be clamped in place by a bolt 28. The spindle projects at its upper end beyond the bracket and provides an arbor portion V' on which may be non-rotatably secured a stack of gear blanks, $a'$, $a''$, $a'''$, etc. The next spindle may be arranged in like manner and may contain a stack of gear blanks $b$, $b'$ and so on.

Figure 6:
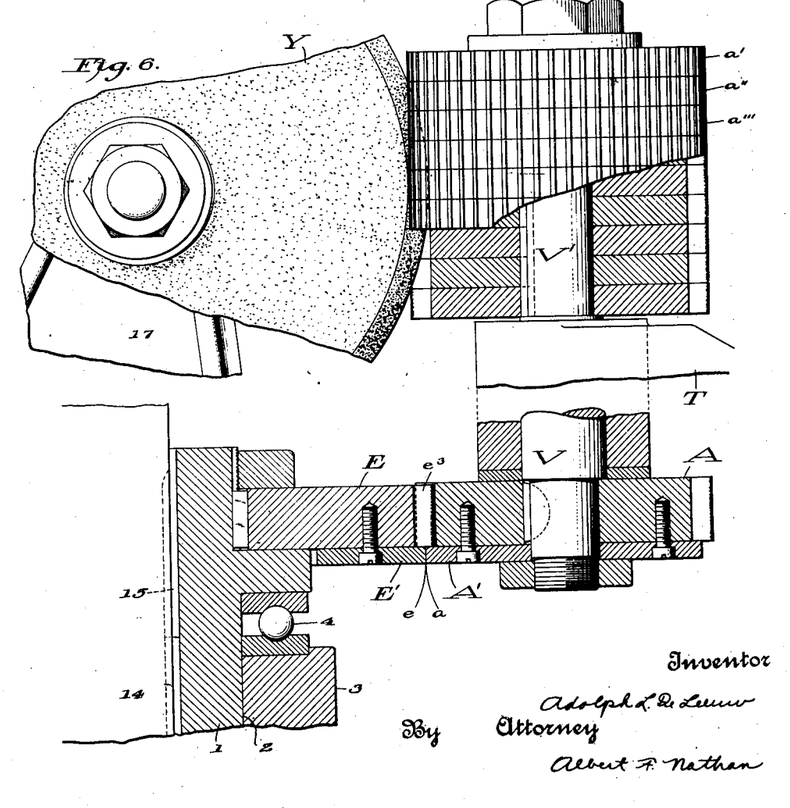
Fig. 6 is a fragmentary detail in vertical section showing similar relationships.

The purpose of this adjustability is to enable each pinion to be so related to the prime gear that the pitch-lines of the pinion and that gear will tangentially coincide. To aid the user in accurately making this adjustment, a ring E' having a smooth periphery $e$ may be permanently secured to the prime gear E; the outside diameter of said ring being exactly equal to the diameter of the pitch circle of the prime gear. Likewise, each pinion will have its appropriate ring; Fig. 6 showing a ring A' affixed to the pinion A, its periphery $a$ coinciding accurately with the pitch-circle of that pinion. Consequently, the user can easily and with absolute accuracy make the adjustment by merely shifting the pinion towards the prime gear as far as the pitch-circle rings permit.

To start the machine, the grinding wheels are first elevated until they completely overlie all of the gear blanks. This elevation is accomplished quickly by throwing the clutch 9 to engage the teeth 30 and hold the shaft 8 against rotation. Since the screw 12 does not turn, but the sleeve 1 does, there will be no differential motion and the stem 14 will quickly rise; carrying with it the abrasive wheels and their acting motors. When sufficiently elevated, the gear blanks are then put on their spindles or arbors and the clutch 9 is thrown to engage the worm wheel 7; whereupon the screw 12 is rotated simultaneously with the sleeve 1 and, through a differential slow effect, the stem 14 is gradually lowered at the predetermined rate of feed; thereby causing the effective grinding regions of the abrasive wheels to pursue a downward helical path entering and leaving successively a tooth notch of a gear blank on each successive spindle, and during each rotation entering a different notch of each gear blank until ultimately all the tooth spaces of all of the gear blanks of each stack will have been completely ground.

Figure 5:
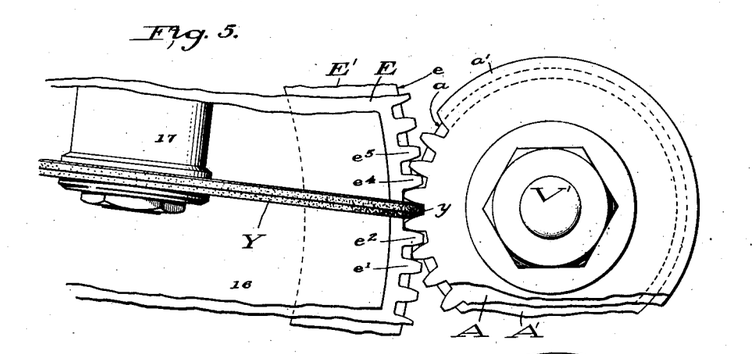
Fig. 5 is an enlarged fragmentary detail showing the coaction between the grinding wheel, the blank being contoured, the prime gear and the auxiliary pinion.

Since the gear-blanks on a given spindle are to be developed by grinding until they become duplications of the master pinion affixed to that same spindle, the gear blanks must roll, with respect to the properly-contoured periphery of the abrasive-wheel, in identically the manner that the master-pinion rolls with respect to some conjugate teeth of the central gear; the periphery of the abrasive wheel, in section, duplicating and coinciding in tangential projection with one of those conjugate teeth. This will be understood best by studying Figs. 5 and 6 in which the periphery of the abrader, at the locality $y$, duplicates the proportions and movements of the middle tooth $e^3$ of the several arcuate teeth $e^1$, $e^2$, $e^3$, $e^4$ and $e^5$ of the central gear.

Now, these teeth can be made very accurately, but no teeth can ever be made, strictly speaking, with geometrical precision or absolutely alike. However, the tendency of the abrasive wheel is not towards the accumulation of errors but towards a greater degree of precision. This is because the relative movement between the abrasive wheel and the gear-blank is not a pure roll but a combined roll and slide. Hence, a given point of the abrasive wheel will act on the gear-blank under the control of successive master-teeth and will therefore, in its repeated action, tend to eliminate or minimize individual errors.

Since the abrading wheel must be initially formed and, from time to time, re-formed to compensate for its gradual wear; this invention provides means for easily doing that in such a manner that the contour of the abrading section will correspond with the average contour of the teeth $e^1$ to $e^5$.

Utilization is made of the principle that the involute form of the tooth approaches a straight line as its limit as the diameter of the pitch circle increases in size. When that diameter becomes infinite, its periphery becomes a rack, and the sides of the teeth of the rack become geometrically straight. Therefore, if a given pinion be replaced by a rack, the grinding wheel would likewise develop straight sided teeth in a rack-blank and, conversely, if the rack-blank be regarded as an abrader and if its teeth were formed with accurate straight sides, then it would dress the abrasive wheel into a tooth-contour conforming accurately to the master tooth of the prime gear E. Inasmuch as an abrasive rack is impractical, it is proposed to employ two diamond points representing each side of the hypothetical abrasive rack and continuously to reciprocate those diamond points rapidly in straight lines to simulate the straight sides of the hypothetical abrasive rack. Such points will serve to dress the grinding wheel accurately to its proper contour.

Figure 9:
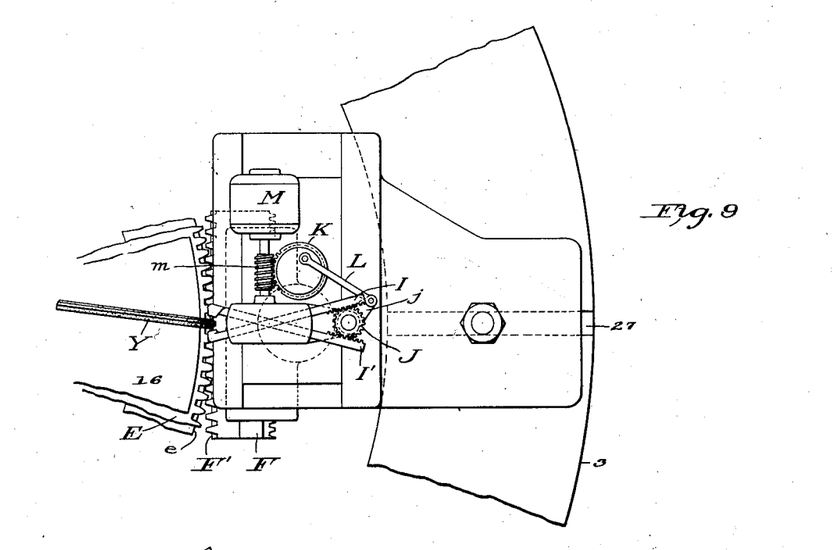
Figs. 9 and 10 are respectively a plan in a vertical section of the dressing device for conditioning the operative surface of the grinding wheels.
Figure 10:
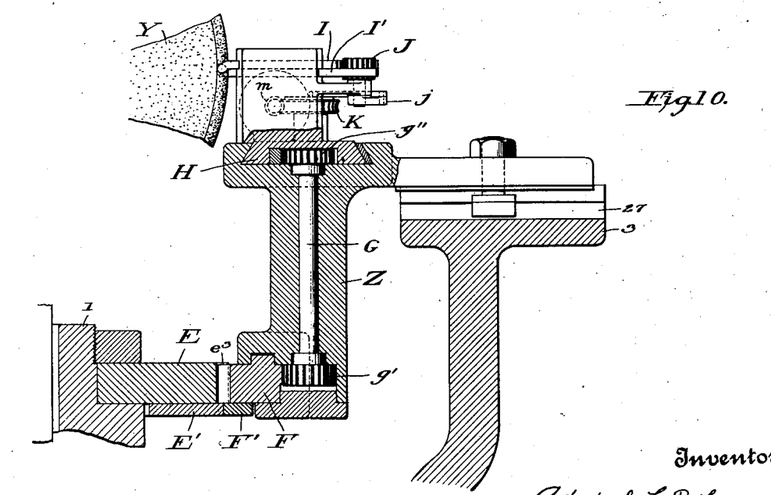

The actual construction may now be understood by referring to Figs. 9 and 10 in which Z represents a bracket having a straight tooth rack F slidably mounted in its lower end, and a carriage H slidably mounted in its upper end; the slideways being accurately parallel with a straight line tangential to the pitch circle e of the prime gear E. This tangential relation may accurately be secured by straight-edge plate F' affixed to the rack F and brought to bear peripherally against the previously mentioned ring E' representing the pitch circle of the prime gear E. The shaft G terminating in gears g' and g'' (accurately meshing with appropriate racks) cause the carriage H to counterpart all of the movements of the rack F, or the carriage H and the rack F may be constituted as a single element slidably mounted in the bracket Z.

On the carriage are two slide rods I and I' inclined in conformity with the inclined sides of the teeth of the rack. The extremities of these slides are offset and provided with diamond points so that these points are each located in the same horizontal plane; the elevation of the carriage H being such that that plane extended will contain the axis of the grinding wheel when spur gears are to be ground. Appropriate means are employed for maintaining the diamond points in a state of rapid reciprocations; such for example as the pinion J operating by crank j through a link L actuated by a crank pin on the worm wheel K which is driven by worm m rotated by suitable motor M. It is to be understood that the diamond extremities are so located that they will reciprocate in lines precisely corresponding with the vertical projection of a master tooth-space of the rack F. The abrasive wheel is gradually shifted horizontally towards the region of the reciprocating diamond points until it has completely attained the appropriate contour; the prime gear E being in a state of motion during its operation. The result will be that the wheel will be accurately conditioned and will be enabled, in its own turn, to grind accurate spur gears.

It has been shown how a stack of gear blanks may be progressively ground by producing a progressive translation of the grinding wheel. However, if it be desired to grind a peripheral series of single comparatively narrow gear blanks, the abrasive wheel may cause to revolve in a flat plane without any axial translation. The large diameter of the abrasive wheel permits it, in such circumstances, to grind relatively narrow blanks quite accurately and various round gears, being all produced by the same system and in a similar manner, will be able to mesh satisfactorily. The highest degree of precision will, however, be obtained by reducing a relative translation between the abrasive wheel and each gear blank as previously explained.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefor, such adaptions should be, and are intended to be, comprehended within the meaning and range of equivalency of the following claims:—

Having thus revealed this invention, I claim as new and desire to secure the following combinations and elements, or equivalents thereof, by Letters Patent of the United States:—

1. A gear-grinding method which consists in rotating an abrasive wheel formed so that a section of its periphery corresponds accurately to a selected tooth-contour; and effecting a relative roll between said peripheral section and a gear-blank progressively along a helical path of closely adjacent convolutions coincident in plan with the pitch-circle of said peripheral section; the radii of the pitch-circles of said section and of said gear-blank respectively having rational values but being in a relatively prime ratio whereby during each complete cycle of said relative roll the periphery of said wheel will enter and develop the contour of a different tooth-space of said gear-blank.

2. A gear-grinding machine combining a central gear; an orbital series of pinions each meshing with said central gear; a duplicate orbital series of gear blanks, each respectively coaxially rigid with its companion pinion; a grinding wheel having a peripheral portion in tangential registry with a tooth of the central gear; means for producing a relative rotation between the central gear and the orbital series to bring the grinding wheel successively into engagement with the successive blanks until each tooth space of each blank has been ground thereby to contour.

3. A gear grinder comprising a central gear; an orbital series of pinions meshing therewith; a stack of gear blanks arranged on each of the spindles of the orbital pinions; a grinding wheel maintained in an invariable angular relation with said central gear; means for producing a relative helical motion between the grinding wheel and said gear blanks to progressively grind all of the teeth of each of said gear blanks.

4. A gear grinder combining a central gear; a plurality of variously sized pinions arranged in an orbital series and meshing therewith; a stack of gear blanks coaxial with each of said orbital gears, said blanks being each substantial duplicates of its associated orbital pinion; a plurality of grinding wheels, each having a portion of its periphery in tangential coincidence with a tooth of said central gear; means for producing a relative rotation between said central gear and its orbital series; and means for simultaneously producing a translation of said grinding wheels along the common axis of the entire system of gears.

5. A gear grinding machine combining a turn-table provided with several master teeth; a grinding wheel having a portion of its periphery in alignment with an intermediate tooth of said several teeth and formed as the tangential counterpart of said tooth; a master pinion; means for causing each of the teeth of said master pinion to engage in identical relation with said master teeth; and a gear blank coaxial with said master pinion and adapted during the angular movement thereof to have its teeth space brought into engagement with said grinding wheel to contour the teeth of said blank in exact accordance with the relation maintained between said pinion and said master teeth.

6. A gear grinding machine combining a central turn-table; a grinding wheel carried thereby; a plurality of spindles arranged in a peripheral series around said turn-table; a gear blank on each spindle arranged to have its periphery within the circular path of the grinding region of the grinding wheel; means for causing the grinding wheel systematically to enter different tooth spaces of each gear blank until all of the tooth spaces have been ground; and means for progressively effecting a relative translation between said turn-table and said gear blanks to accomplish the grinding of the entire tooth width of the gear blanks.

7. A gear grinding machine combining a turn-table; a large gear concentric therewith; a peripheral series of adjustably mounted spindles; a master pinion on each of said spindles meshing with said large gear; a similar gear blank on each of said spindles; a grinding wheel carried by said turn-table and adapted progressively to grind all points of the tooth spaces of said gear blanks; and means for simultaneously rotating and translating said gear wheel with respect to said gear blanks.

8. A gear grinding machine combining a base gear; an orbital series of pinions each meshing with said central gear, the teeth of said pinions bearing a relatively prime ratio to the teeth of said gear; a duplicate orbital series of gear blanks each coaxially rigid with its companion pinion; a grinding wheel having a peripheral portion in tangential registry with a tooth of the base gear; means for producing a relative rotation between the base gear and the pinions to bring the grinding wheel successively into engagement with the successive blanks until each tooth space of each blank has been ground thereby to contour.

9. A gear grinder comprising a central gear having a prime number of teeth; an orbital series of pinions meshing therewith; a stack of gear blanks arranged on each of the spindles of the respective pinions; a grinding wheel maintained in constant angular relation with said central gear; and means for producing a relative helical motion between the grinding wheel and said gear blanks to progressively grind all of the teeth of each gear blank.

10. A gear grinder combining a central gear; a plurality of variously sized pinions arranged in orbital series and meshing therewith; a stack of gear blanks coaxial with each of said orbital gears, said blanks being each substantial duplicates of its associated orbital gear; a plurality of grinding wheels, each having a portion of its periphery in tangential coincidence with a corresponding tooth of said central gear, the teeth intervening between said corresponding teeth being one less than prime in number; means for producing a relative rotation between said central gear and the pinions; and means for simultaneously producing a relative translation between said grinding wheels and said pinions along the common axis of the entire system of gears.

11. A gear-grinding method which consists in rotating an abrasive wheel formed so that a section of its periphery corresponds accurately to a selected tooth-contour; and effecting a relative roll between said peripheral section and a gear-blank progressively along a path coincident in plan with the pitch-circle of said peripheral section; the radii of the pitch-circles of said section and of said gear-blank being in a relatively prime ratio whereby during each complete cycle of said relative roll the periphery of said wheel will enter and develop the contour of a different tooth-space of said gear-blank.

12. A gear-grinding method which consists in rotating an brasive wheel formed so that a section of its periphery corresponds accurately to a selected tooth-contour; and simultaneously effecting a relative roll between said peripheral section and a plurality of dissimilar gear-blanks progressively along a path coincident in plan with the pitch-circle of said peripheral section; the radius of the pitch-circles of said section and the various dissimilar radii of said gear-blanks being all in a relatively prime ratio, whereby during each complete cycle of said relative roll the periphery of said wheel will enter and develop the contour of a different tooth-space of each of said dissimilar gear-blanks.

13. A gear-grinding method which consists in rotating an abrasive wheel formed so that a section of its periphery corresponds accurately to a selected tooth-contour; and simultaneously effecting a relative roll between said peripheral section and several stacks of gear-blanks progressively along a helical path coincident in plan with the pitch-circle of said peripheral section, the gear-blanks of a given stack being all of the same radius but different from the radii of another stack; the radii of the pitch-circles of said section and of said gear-blanks being all in a relatively prime ratio, whereby during each complete cycle of said relative roll the periphery of said wheel will enter and develop the contour of a different tooth-space of said gear-blank.

In witness whereof, I have hereunto subscribed my name.

ADOLPH L. DE LEEUW.